Patented Aug. 19, 1930

1,773,500

UNITED STATES PATENT OFFICE

KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK GESELLSCHAFT MIT BESCHRÄNKTER HAFTUNG, OF DUSSELDORF-OBERKASSEL, GERMANY

MANUFACTURE OF INACTIVE MENTHOL

No Drawing. Application filed June 29, 1927, Serial No. 202,457, and in Germany December 27, 1926.

The present invention refers to a new method of manufacturing inactive menthol, the racemate of natural menthol, from its isomers.

The process consists in heating to temperatures above 100 degrees centigrade the said isomers of inactive menthol with mentholates of the earth alkaline metals. Suitable mentholates of the earth alkaline metals are those of the calcium, barium, strontium, magnesium, aluminium, which mentholates have not yet been described. One may use the mentholates derived from inactive menthol or its isomers.

The mentholates usuable for the present process may be prepared either by the action of the earth alkaline metal (suitable for the preparation of aluminium mentholate) on inactive menthol viz. its isomers or by the reaction of inactive menthol viz. its isomers with suitable compounds of the earth alkaline metals, for instance earth alkaline alcoholates or earth alkaline amides. One may prepare the mentholates of the earth alkaline metals before their action on the isomers of the inactive menthol, isolate the said mentholates and then cause them to act on the isomers of the inactive menthol. One may however also form the mentholates of the earth alkaline metals in the presence of surplus inactive menthol or in the presence of surplus isomers of the inactive menthol to be transformed into the latter. It is not necessary that the metal and the menthols are used in a molecular proportion, one may use less amounts of the earth alkaline metal or metal compound than necessary to bind all menthol in the form of a mentholate.

The isomers of the inactive menthol to be treated for the manufacture of inactive menthol are for instance the hydrogenation products of thymol, inactive menthone, inactive isomenthone, or inactive piperitone ($\Delta^1$-p-menthen-3-one), freed from inactive menthol (the racemate of natural menthol) by a cooling or fractionating process, see U. S. Patent 1,625,771, dated April 19th, 1927, and the copending applications Serial Number 118,833 filed June 26th, 1926, Serial Number 118,834 filed June 26th, 1926. The isomers contained therein are firstly inactive neomenthol, (melting point 51-52 degrees centigrade, boiling point 212 degrees centigrade, at 760 mm. pressure, acid phthalate melting point 177 degrees centigrade, paranitrobenzoate melting point 79—80 degrees centigrade); secondly inactive neoisomenthol (melting point 12-14 degrees centigrade, boiling point 214.5 degrees centigrade at 760 mm. pressure, acid phthalate melting point 90-92 degrees centigrade, paranitrobenzoate melting point 56 degrees centigrade); thirdly solid isomenthol (melting point 52-53 degrees centigrade, boiling point 218 degrees centigrade at 760 mm. pressure, acid phthalate melting point 113-115 degrees centigrade, paranitrobenzoate melting point 65 degrees centigrade); see the copending application Serial Number 146,564 filed November 5th, 1926.

One may also use mixtures of the several isomers of the inactive menthol.

By heating the isomers of the inactive menthol with mentholates of earth alkaline metals one obtains a mixture containing inactive menthol which latter may be separated by a freezing out process or a fractional distillation or both operations, see U. S. Patent 1,625,771 dated April 19th, 1927, and the copending applications Serial Number 118,833 filed June 26th, 1926, Serial Number 118,834 filed June 26th, 1926. The mixtures freed from inactive menthol may be mixed with isomers of inactive menthol obtained by any other method and may then be subjected again to the present process, or may be agitated if desired after admixture of thymol, inactive menthone or inactive isomenthone or inactive piperitone or mixtures of them, in the presence of hydrogenating catalysts and hydrogen under pressure, whereby new amounts of inactive menthol are formed (see U. S. Patent 1,625,771 dated April 19th, 1927, and the copending applications Serial Number 118,833 filed June 26th, 1926, and Serial Number 118,834 filed June 26th, 1926).

*Example 1.*—100 parts by weight of inactive neoisomenthol (melting point 12-14 degrees centigrade) are mixed with 10 parts by weight of calciumethylate (or calciummethylate, calciumisopropylate, magnesiumethylate, magnesiummethylate, magnesiumisopropylate, aluminiumethylate, aluminiummethylate, aluminiumisopropylate) and heated in a suitable vessel to about 180 degrees centigrade. The alcohol liberated in consequence of the formation of the mentholate of earth alkaline metals is led away from the vessel. The heating at the indicated temperature is continued for about 24 hours. After this time the mixture is distilled by means of steam and the distillate is condensed. One may separate, for instance by decantation, the condensed menthols from the water. The distillate is a mixture of the several inactive menthols, including inactive menthol, which may be separated by means of freezing out or by fractional distillation or by both operations which may be carried out in the manner described by the cited copending applications. The isolated inactive menthol may be purified according to the method described in the copending application 146,564 filed November 5th, 1926.

The isomers of inactive menthol separated from the latter may be heated again with new portions of the mentholates of earth alkaline metals.

One may add 50 parts by weight of inactive liquid menthols mixture—obtained for instance by hydrogenating thymol with hydrogenating catalysts under pressure after inactive menthol having been separated by any of the methods described in the cited copending applications—to the isomers of inactive menthol obtained by the present process and separated from inactive menthol, and heat the mixture thus obtained again with 10 parts by weight of calciumethylate (or another alcoholate or an alcoholate of another earth alkaline metal indicated above).

*Example 2.*—100 parts by weight of inactive neomenthol, melting point 51—52 degrees centigrade and 10 parts by weight of ethylate of aluminium (or another alcoholate or an alcoholate of another earth alkaline metal indicated above) are heated as described in Example 1. The menthols are isolated by distillation in vacuo. From the distillate the inactive menthol is isolated and purified as described in Example 1. The residue of mentholate remaining after the distillation of the menthols may be used for treating further amounts of the isomers of inactive menthol.

*Example 3.*—10 parts by weight of calciumethylate (or another alcoholate or an alcoholate of another earth alkaline metal indicated above) are heated with 20 parts by weight of inactive menthol (or inactive neomenthol or inactive neoisomenthol) to above 100 degrees centigrade and the formed alcohol is distilled off. Then 100 parts by weight of inactive neomenthol, isomenthol or neoisomenthol are added and the mixture is heated to about 180 degrees centigrade for 24 hours. The product is treated as in Example 1.

*Example 4.*—100 parts by weight of solid inactive isomenthol, melting point about 53 degrees centigrade, are mixed with 1.5 parts by weight of activated aluminium (obtained by allowing to act on aluminium small amounts of caustic soda lye and hydrargyrumbichloride or hydrargyrumbichloride and iodine) and heated to about 180 degrees centigrade for about 40 hours, after the aluminium has been completely dissolved, which is recognizable by the evolution of hydrogen having ceased. The further treatment may be that of Example 1 or 2.

*Example 5.*—100 parts by weight of inactive neomenthol, melting point 51–52 degrees centigrade and 100 parts by weight of inactive neoisomenthol, melting point 12–14 degrees centigrade and 100 parts by weight of solid inactive isomenthol, melting point about 53 degrees centigrade are mixed with 30 parts by weight of calciumethylate (or another alcoholate or an alcoholate of another alkaline earth metal indicated above) and heated for about 20 hours to about 200 degrees centigrade. The further treatment may be that of Example 1 or 2.

We claim:—

1. The process of manufacturing inactive menthol, the racemate of natural menthol, which consists in causing mentholates of the earth alkaline metals to react with the isomers of inactive menthol at temperatures above 100° C. and for a period of 10 to 40 hours.

2. The process of manufacturing inactive menthol, the racemate of natural menthol, which consists in causing mentholates of the earth alkaline metals to react with the isomers of inactive menthol at a temperature above 100° C.

3. The process of manufacturing inactive menthol, the racemate of natural menthol, which consists in causing mentholates of the alkaline earth metals to react with the isomers of inactive menthol at temperatures above 100° C. for a period of 10 to 40 hours and then separating the formed inactive menthol from the reaction product obtained.

4. The process of manufacturing inactive menthol, which consists in causing mentholates of the alkaline earth metals to react with the isomers of inactive menthol at temperatures above 100° C. for a period of 10 to 40 hours, separating the formed inactive menthol from the crude reaction product and causing the said reaction product separated from the inactive menthol, to react with fresh portions of mentholates of the alkaline earth metals.

5. The process of manufacturing inactive menthol which consists in reacting on mentholates of the alkaline earth metals with the isomers of inactive menthol at temperatures above 100° C. for a period of 10 to 40 hours, separating the formed inactive menthol from the mass produced, adding to the said reaction product fresh portions of the isomers of inactive menthol and causing the said mixture to react with fresh portions of mentholates of the alkaline earth metals.

In testimony whereof we hereunto affix our signatures.

KARL SCHÖLLKOPF.
ARTHUR SERINI.